(12) United States Patent
Soell et al.

(10) Patent No.: US 6,523,600 B1
(45) Date of Patent: *Feb. 25, 2003

(54) DIE CASTING MACHINE

(75) Inventors: Guido Soell, Urbach (DE); Wolfgang Fussnegger, Tuebingen (DE)

(73) Assignee: DaimlerChrysler AG, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/937,356

(22) Filed: Sep. 24, 1997

(30) Foreign Application Priority Data

Sep. 24, 1996 (DE) .......................................... 196 39053

(51) Int. Cl.⁷ .......................... B22D 33/04; B29C 45/64
(52) U.S. Cl. ........................ 164/341; 164/137; 425/595
(58) Field of Search ................................ 164/137, 341; 425/595, 47, DIG. 129

(56) References Cited

U.S. PATENT DOCUMENTS

| | | | |
|---|---|---|---|
| 354,742 A | * 12/1886 | Sabold | ........................ 249/166 |
| 1,107,477 A | * 8/1914 | Bartels | ......................... 109/79 |
| 3,843,295 A | * 10/1974 | Greenberg et al. | ........... 141/368 |
| 4,341,258 A | * 7/1982 | Wigdahl | ....................... 164/341 |
| 5,091,124 A | * 2/1992 | Zakich | ..................... 264/328.6 |

FOREIGN PATENT DOCUMENTS

| | | | |
|---|---|---|---|
| DE | 39 31 194 A1 | 3/1991 | |
| DE | 4037406 | * 5/1992 | ................. 425/595 |
| DE | 41 41 259 C2 | 10/1993 | |
| DE | 42 36 061 A1 | 4/1994 | |
| DE | 42 43 735 C2 | 6/1996 | |
| JP | 63-54468 | 10/1988 | |
| JP | 6-126413 | 5/1994 | |
| JP | 6-142882 | 5/1994 | |
| JP | 7-186223 | 7/1995 | |
| JP | 7-43960 | 10/1995 | |
| RU | 479-653 | * 11/1975 | |

OTHER PUBLICATIONS

The Random House College Dictionary, Jess Stein, 1980, Revised Edition, p. 398.*

The Future Of The Use Of Aluminium For Automotive Applications, Von Gerd Springe, Leichtmetalle im Automobgilau, 2 pages.

Thixocasting—A Future Technologie, Von Bernd Wendlinger et al., Leichtmetalle im Automobgilau, 3 pages.

Neuzeitliche Druckgiessmaschinen für präzise, grossvolumige Druckgussteile, W. Bovensmann, pp. 115–119.

* cited by examiner

*Primary Examiner*—M. Alexandra Elve
*Assistant Examiner*—Kevin McHenry
(74) *Attorney, Agent, or Firm*—Crowell & Moring LLP

(57) ABSTRACT

A die casting machine has a divisible die casting tool. To be able to die cast in a secure manner large die-cast parts beyond elasticity-caused limits of the machine construction, the locking pressures for the die casting tool are transmitted by tool-integrated tie rods into a power flux circuit remaining within the die casting tool. In the closed condition of the die casting tool, the tie rods can be anchored in a tension proof manner on both sides of its mold parting surface in the die casting tool and, for the opening, can be detached at least from one of the tool parts of the die casting tool. For limiting the flow paths of the molten mass, several casting cylinders for feeding the casting material into the casting mold are distributed thereon so that the casting mold can be filled simultaneously from several points. For adapting the die casting machine to different die casting tools, the casting cylinders are adjustably held in their position parallel to the parting plane of the tool halves and can be fixed in the respective adjusting position.

10 Claims, 4 Drawing Sheets

DIE CASTING MACHINE

BACKGROUND AND SUMMARY OF THE INVENTION

This application claims the priority of German application 196 39 053.2, the disclosure of which is expressly incorporated by reference herein.

The present invention relates to a die casting machine having a divisible die casting tool and a device for opening and closing the die casting tool as well as having a device for pressing together mutually detachable tool parts during the casting operation against the spreading forces acting upon them on the part of the molten mass affected by pressure.

W. Bovensmann "Neuzeitliche Druckgiegmaschinen fur präzise, großvolumige Druckgußteile" ("Modern Die Casting Machines for Precise Large-Volume Die-Cast Parts") in the Journal Gießerei-Praxis, No. 7/1966, Pages 115 to 119, describes only die-casting in detail, although since 1966 other similar-type casting processes have also been considered. In this connection, die-casting with an evacuated die-casting mold as well as thixocasting and thixoforming are known casting processes. Generally, these are deforming processes in which a metal quantity adapted to the workpiece size is charged into an openable and closable shaping tool made of metal. The mold is filled with the flowable light metal which is shaped under the effect of a high pressure. The workpiece is then caused to solidify under the effect of this pressure until the workpiece can be handled and is removed from the mold. Here, the term "die casting" includes all known shaping processes which fall under this sub-definition.

In the above context, reference can, for example, also be made to the special edition of the journals ATZ and MTZ for the year 1996 concerning the topic "Light Metals in Automobile Construction" containing the following-articles by B. Wendiger, A. Mundl: "Thixocasting—A Deforming Technique with a Future"; or by G. Springe: "The Future of the Use of Aluminum in Automobile Construction".

In principle, the known die casting machines are built like a horizontal press with two opposed, vertically standing clamping plates, of which one can be driven in a stationary and the other can be driven in a liftable manner. By way of four tie bars, the movable clamping plate is guided parallel to the stationarily held clamping plate. On the mutually facing sides of the clamping plates, the respective parts of the die casting tool are clamped and are divided along a vertical mold parting plane. This arrangement is required because of a standing casting position. The mold must fill in an ascending manner in the direction of the gravitational force.

As above mentioned, during the casting and the subsequent setting, a high pressure is exercised on the molten mass which endeavors to drive apart the parts of the die casting tool. The level of the spreading force is the result of the level of the pressure and of the projected area of the metal-wetted surfaces of the die casting tool. The die casting tool must be held in the closed condition by a clearly higher force so that the tool parts will not open, not even slightly, and no casting burr can form at the edges. The required closing forces are transferred by way of the tie bars and the clamping plates to the parts of the die casting tool. A hydraulic cylinder acts in the closing direction onto the movable clamping plate and is supported on a crosshead which is rigidly connected via the tie bars with the stationary clamping plate.

In known die casting machines, the size of the castings which can be safely cast in the process is limited by the elasticity of the clamping plates. Under the load of the closing forces which are applied on the edge side by way of the tie bars to the stationary clamping plate, on one hand, and the pressure forces of the die casting tool which act upon it essentially in the center, on the other hand, because of Hook's law, a slight but nevertheless unavoidable deformation of the clamping plates and of the die casting tools carried thereby will occur. The increasing size of the die casting tools causes not only an intensification of the effective forces, specifically with the second power of the linear dimension, but the bends will also increase, specifically with the third power of the linear dimension. With a 10% enlargement of the clearance between the tie bars and with a 10% enlargement of the lateral length of the die-cast part, while the conditions are otherwise comparable, the occurring forces are approximately 21% larger, and the bends, at 100% of the forces, are approximately 33% larger, and at 121% of the forces are approximately the sum of these increases, thus approximately 54% larger. With a 20% enlargement of the linear dimension of a die casting machine, the bends increase approximately to twice the size while the conditions are otherwise comparable. Although the bend can be compensated by suitable stiffening measures on the clamping plates, these measures are only partly effective because the laws of nature (here, Hook's law) cannot be canceled by constructional techniques. A remaining bend will always remain and it is at most a question of whether the extent of the bend can be tolerated. Starting at a certain span between the tie bars, even stiffening measures will no longer be effective for keeping the bending of the clamping plates within tolerable limits. As a result of the elasticity of the building material, at least in the situation of this size of die casting machines, a natural limit is reached for the workpiece size.

An object of the present invention is to improve the known die casting machine such that, beyond the indicated, elasticity-caused limits of a die-cast part size, die-cast parts can be cast in a reliable manner according to the process, i.e., with only slight and easily tolerable elastic deformations of the machine parts and tool parts after the die casting process.

This object has been achieved according to the present invention by providing a directly mutual, openable and closable, form-locking clamping-together of the mutually detachable tool parts of the die casting tool which transmits the closing pressures counteracting the spreading forces in a power flux circuit remaining within the die casting tool. Accordingly, the power flux circuit for holding together the parts of the die casting tool are short-circuited within the die casting tool so that the clamping plates are no longer loaded by the closing forces.

The tool parts clamped onto the clamping plates benefit fully with respect to the stiffness from the stiffness of the clamping plates. With respect to their position and their mutual distance, the tool-integrated tie rods for holding together the die casting tools can be adapted individually for each workpiece to the respective die-cast part which results in optimally short bending lengths therebetween. Mainly, one or several tie rods can be placed in the interior of the outer contour of the die-cast part, specifically if, as normally, the die-cast part has open areas in the manner of a window-type breakthrough, a framed compartment, or the like.

The present invention offers advantages not only with respect to a reliable manufacturing of previously uncontrollable large die-cast parts but can advantageously also be used with conventional size die casting machines because such machines can easily be constructed lighter and therefore lower in cost.

In order to be able to limit the flow paths of the molten mass to sections within large die casting tools which can be covered by the molten mass scattered into small droplets without any excessive cooling, an advantageous embodiment of the invention provides several distributed casting cylinders for feeding material for casting into the casting mold so that the casting mold can be filled with the molten mass simultaneously from several points.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
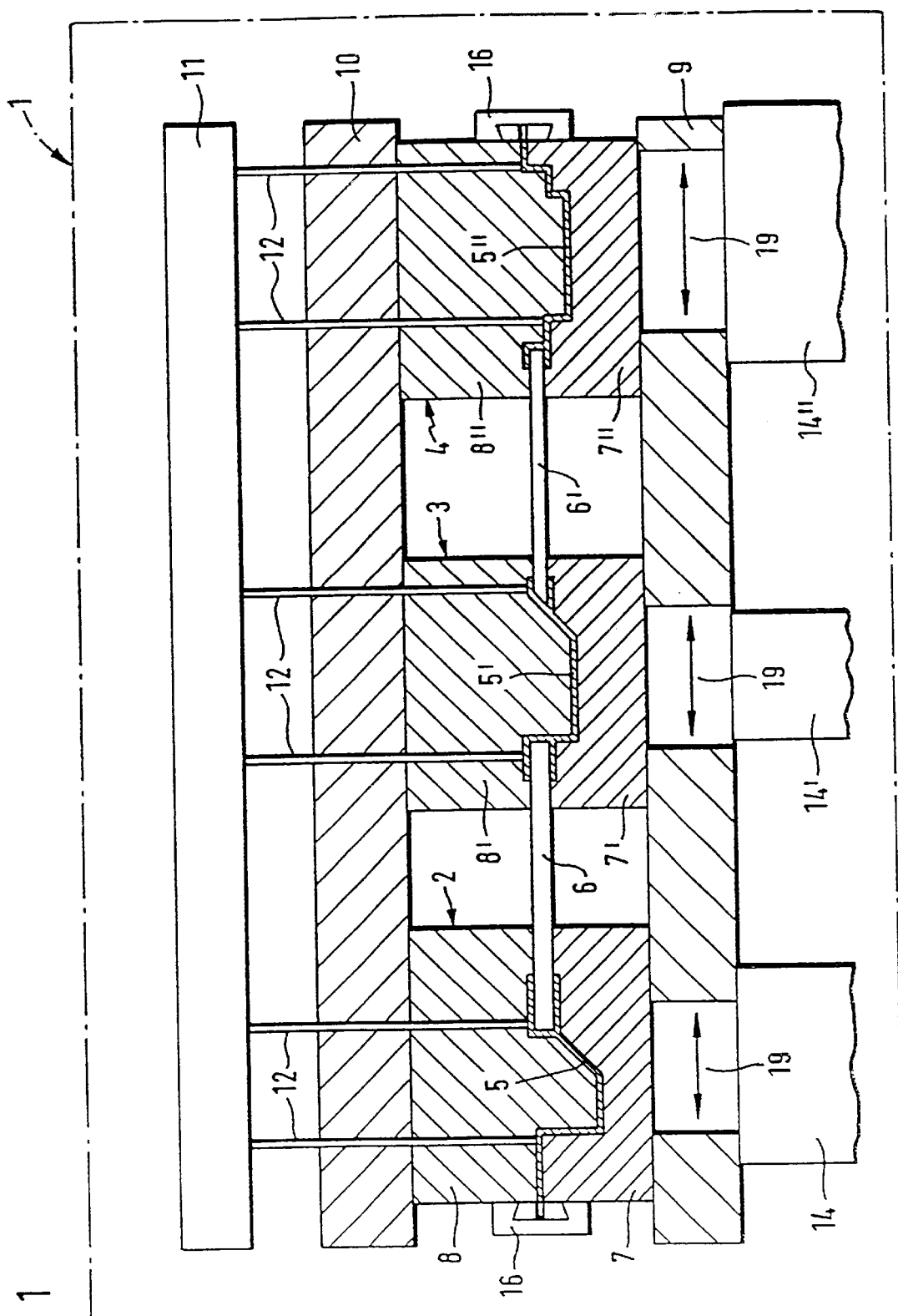
FIG. 1 is a partial cross-sectional view of a die casting machine with several simultaneously fillable die casting tools arranged therein.
Figure 2:
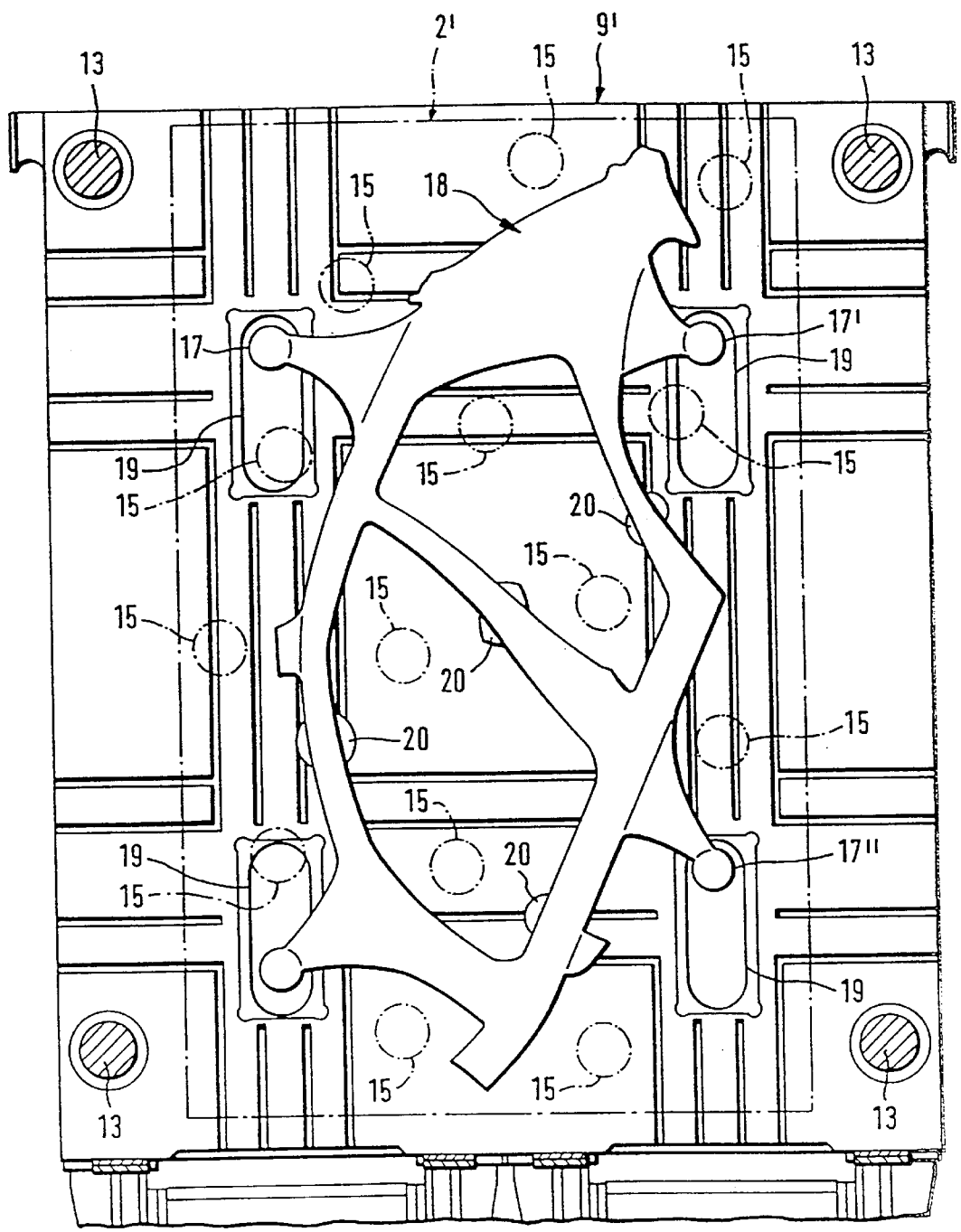
FIG. 2 is a view of a large workpiece in a die casting machine whose casting mold can be filled from several feeding points.

The following description of the construction of a die casting machine with the die casting tools arranged therein with reference to FIGS. 1 and 2 applies at least partially to the constructions shown in FIGS. 3, 5, 6 and 8. The die casting machines, outlined in FIG. 1 by a dash-dotted contour line for the die casting machine, contain a stationary clamping plate 9, 9' which, although they may also be arranged horizontally, o a re usually arranged vertically as in FIG. 2, in contrast to the representations in FIGS. 1, 3, 5 and 8.

In FIG. 1, the stationary tool parts 7, 7' or 7" of three die casting tools 2, 3 and 4 are fastened on the stationary clamping plate 9. In the embodiment of FIG. 2, the stationary tool part of a large uniform die casting tool 2' is clamped onto the stationary clamping plate 9'. The embodiments according to FIGS. 1 and 2 each have several casting cylinders 14, 14', 14" (FIG. 1) or 17, 17', 17" (in FIG. 2) provided on the clamping plate in a distributed manner for feeding casting material into the casting mold. These casting cylinders simultaneously feed molten mass from several points into the casting mold so that short filling and flow paths occur despite the large workpiece dimensions. Corresponding to the several die-cast part areas, several overflow points 20 are also provided on the die casting tool. For an adaptation to local situations and ratios of workpiece sizes, the casting cylinders can be moved in an oblong hole 19 parallel to the clamping plate 9, 9' and can be adjusted into a respective required position where they are fixed.

A clamping plate 10 is arranged opposite the stationary clamping plate 9, 9', and can be moved parallel along tie bars 13 via a corresponding moving drive (not shown). The movable clamping plate carries the movable tool parts 8, 8', 8" of the three die casting tools 2, 3, and 4 as seen in FIG. 1. Behind the movable clamping plate 10, a separately movable and guided ejector plate 11 is arranged from which slim ejector pins 12 penetrate the clamping plate 10 and the movable tool part 8, 8', 8" to the workpiece. As required, such ejector plates 11 and ejector pins can also be provided on the side of the stationary tool parts.

In the embodiment of the die casting machine according to FIG. 1 with three die casting tools 2, 3 and 4, three die castings 5, 5' and 5" can be cast simultaneously. A special feature of the embodiment of FIG. 1 is that the three mentioned workpieces are not to be cast as separate individual workpieces, i.e. the most readily apparent use, but are to be combined in a uniform large workpiece by a casting-together with insertion parts 6 and 6'. The insertion parts 6 and 6' can themselves be castings made of the same material or deep-drawn sheet metal pieces made of sheet steel or aluminum sheet.

The embodiment of FIG. 2 goes one step further. That is, a large workpiece 18, such as a complete side panel part of a vehicle body, is cast as a uniform workpiece. The side panel part contains the two door openings, and the connection and junction elements to adjoining members of the vehicle body. On the bottom and on the top, the floor side member and the roof side member are arranged in the side panel part. Toward the front, the driver's door opening is bounded by the side member of the windshield and the stop column for the driver's door, the so-called A-column. The center column, the so-called B-column, is situated between the two doors; the rear door opening is bounded toward the rear by the wheel frame and the so-called C-column. During the manufacture of the body shell, an outside covering made of drawn sheet metal, preferably of a light sheet metal, is welded onto this interior structural component of a complicated shape which, however, is easy to manufacture with respect to casting, so that a stable side panel construction is produced and formed of hollow sections. The outer shell of this side panel construction corresponds to the shape of the body shell of the vehicle body and which, with respect to its surface shape, meets standards of high visual quality.

As mentioned above, it is very difficult to manufacture such large die-cast workpieces as a uniform workpiece. In order to safely control the explosive forces which, during the filling and during the workpiece setting act upon the tool parts ⅞, ⅞' and ⅞" as a result of the highly pressurized molten mass, the tool parts which can be detached from one another are form-lockingly and in a loadable manner directly connected with one another before and during the casting. Thereby, the locking pressures counteracting pressures created by the flow of the explosive forces can be transmitted within a "power flux circuit" in which the locking pressures from the counteracting force flow are isolated within the die casting tool. This idea can be applied not only to die casting machines for large workpieces but advantageously also to those for conventionally controllable workpieces. Specifically, those die casting machines can then be made lighter and cheaper.

Figure 5:
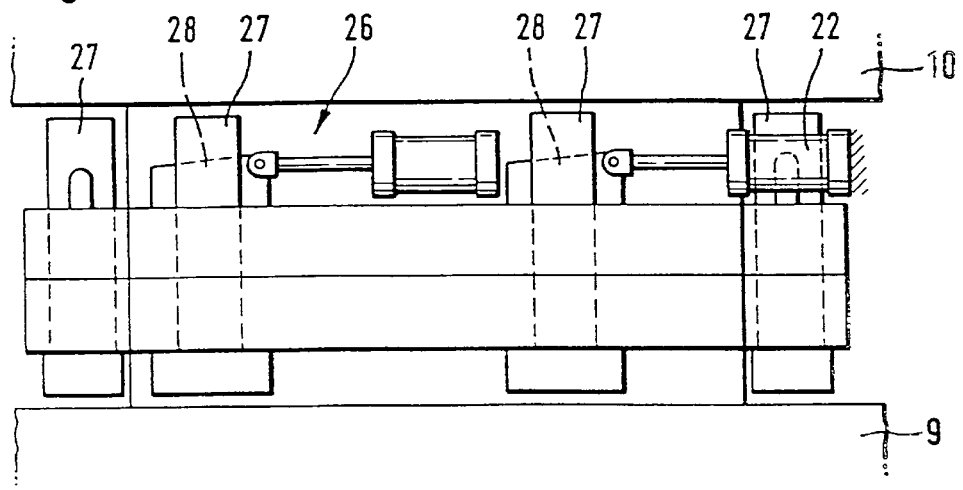
FIG. 5 is a side view of another embodiment of a die casting tool with a mutual securing of the tool halves by way of tie rods which in the movable tool half can be locked by insertable wedges.
Figure 6:
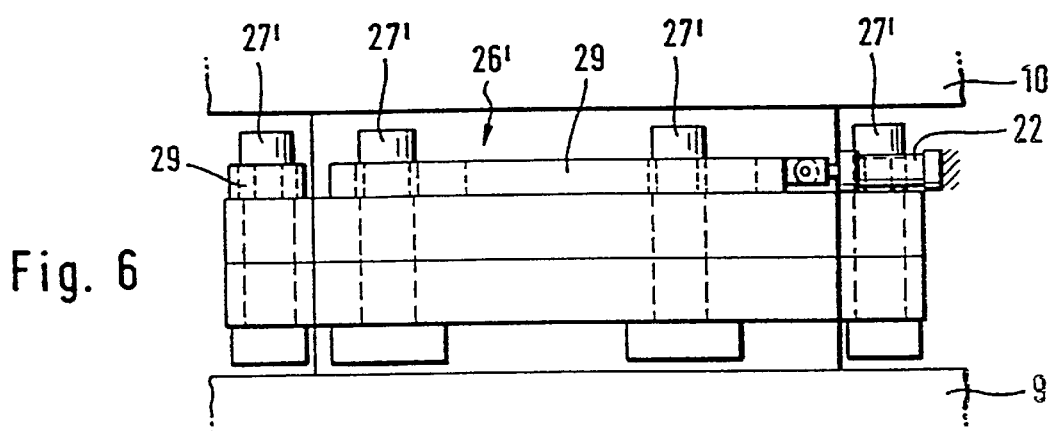
FIG. 6 is a side view of another embodiment of a die casting tool similar to that of FIG. 5, but in which the tie rods are lockable by a sliding strip with keyhole-type openings.
Figure 8:
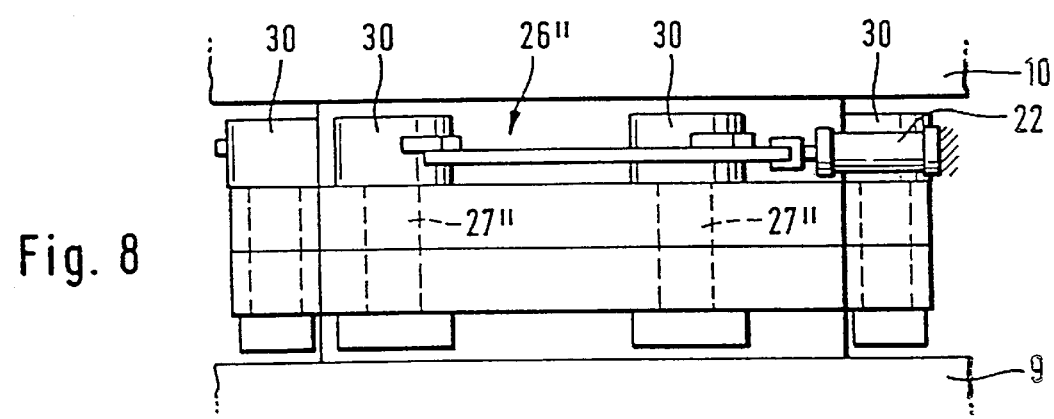
FIG. 8 is a side view of yet another embodiment of a die casting tool similar to that of FIG. 5 but with a locking of the tie rods in the manner of a bayonet catch.

For the direct form-locking coupling of the tool halves, several in embodiments (FIGS. 2, 5, 6 and 8), tie rods 15, 27, 27', 27" are integrated on or in the die casting tool and extend on both sides of the mold parting surface of the die casting tool to restrict the locking pressures in the power flux circuit to within the die casting tool. In the embodiments of FIGS. 5, 6 and 8, the tie rods are anchored by a head in a firmly adhering manner in the stationary tool part and, in the closed condition of the die casting tool, are anchored in a tension-proof but detachable manner on the opposite movable tool part. The detachable anchoring have different constructions in the several embodiments. This anchoring is released for the opening of the tool parts.

In other embodiments of the die casting tools (FIGS. 1 and 3), locking devices 16, 16' of a different type are mounted therein. The locking device 16 or 16' comprises a trapezoidal cross-section retaining strap mounted on the outside on the stationary tool part and cut from the solid blank. The locking device extends along the entire side of the die casting tool 2, 3, 4 and 4' which is to be locked. Because of its semi-dovetail profile, the retaining strip is referred to here as a dovetail strip 23. Several dovetail claws 24 are mounted on the opposite movable tool part, and have a cross-section formed in a mirror-inverted manner with respect to the dovetail strip 23. The claws 24 have upward-pointing flanks sloped in a wedge-shaped manner against the displacing direction.

Figure 4:
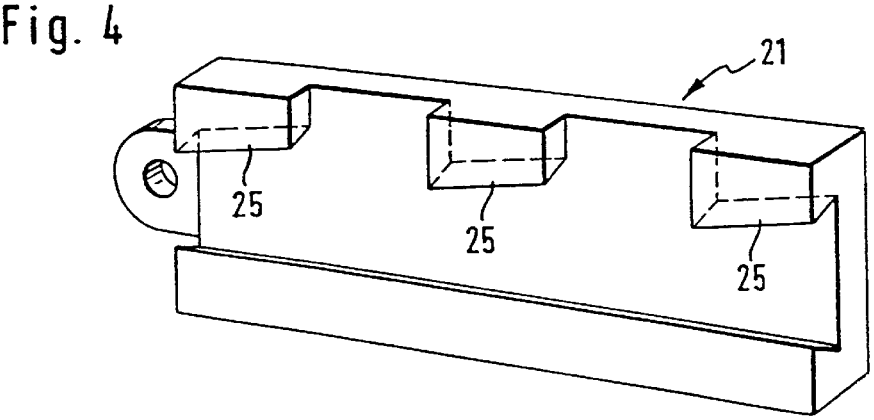

A sliding plate 21 (an individual one being shown from the interior side in FIG. 4) is pushed over the dovetail strip 23 and the row of dovetail claws 24. The bottom side of the sliding plate 21 reaches around the dovetail strip by a continuous strip and, on the top side, has individual counterclaws 25 adapted to the dovetail claws and a mutual clearance larger than the width of the dovetail claws 24. The sliding plate 21 is slidable back and forth between two end positions by way of the locking cylinder 22 which can be acted upon hydraulically or pneumatically. The housing of the locking cylinder 22 is held in a stationary manner.

Figure 3:
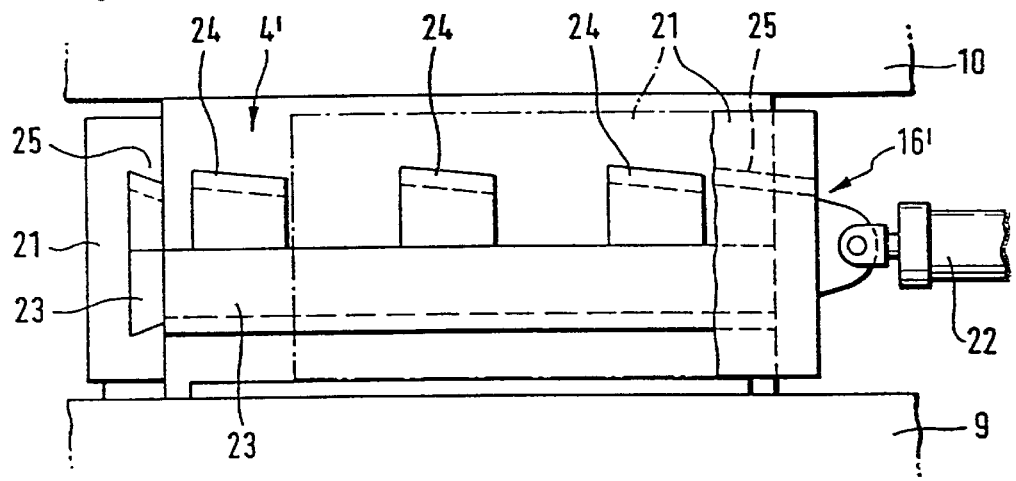
FIGS. 3 and 4 are, respectively, a side view of another embodiment of a die casting tool situated in a die casting machine with a locking of the tool halves by way of a sliding plate and a perspective view of the sliding plate alone.

In the open position illustrated in FIG. 3, the dovetail claws 24 are released by the spaces between the counterclaws 25 so that the upper tool part can be lifted off the lower tool part without any hindrance. In the opposite end position situated on the left in FIG. 3, i.e. the closing position, the counterclaws 25 reach over the tool-side dovetail claws 24 and, because of a corresponding displacement force of the sliding plate 21 and the slope of the mutually contacting flanks, the tool-side dovetail claws 24 are held at a high prestress against the displacement direction. As a result, the die casting tool is held together at a high force, so that the power flux counteracting the internal pressure in the casting mold remains within the die casting tool.

In the embodiment of FIG. 2, several tie rods 15 indicated by a dash-dotted line are arranged for the form-locking holding-together of the two tool halves of the die casting tool 2'. These tie rods are arranged not only around the outer contour of the workpiece 18 in the die casting tool but also within open areas of the workpiece, for example, inside the openings for the doors. Because of the numerous tie rods arranged at short mutual distances in a distributed manner, short bending paths of the tool parts are obtained between the tie rods. Thereby, despite its size, the die casting tool can also be held in a securely closed manner also against high pressures of the molten mass.

Figure 9:
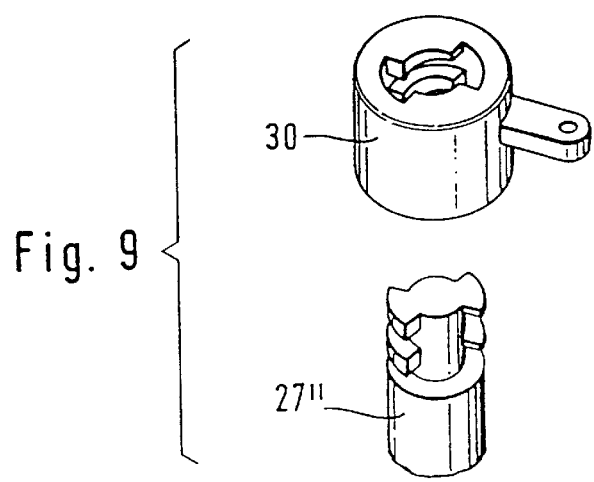
FIG. 9 is a perspective exploded view of the upper tie rod end and the locking ring of the tie rod locking system of FIG. 8.

Although the type of the anchoring of the detachable end of the tie rods in the corresponding tool part is not specifically shown in FIG. 2, an anchoring by way of a locking ring of the type shown in FIG. 9 is advantageous. Because of the large number and the irregular position of the tie rods and the locking rings, it appears advantageous, however, to provide a central rotary drive for all required locking rings. For example, all locking rings can be constructed as a chain wheel on their outer circumference or can be connected with such a chain wheel, and can be mutually coupled with respect to the drive by driving chains. A single locking cylinder applied to one of the drive chains allows all locking rings to be rotated simultaneously, and in this manner all tie rods may be simultaneously anchored and released again.

For anchoring the upper end of the tie rod 27 in the movable tool part of the die casting tool 26, the embodiment of FIG. 5 accomplishes locking with a narrow locking wedge 28 which can be pushed into a correspondingly axially extending slot or oblong hole in the tie rod to such an extent that it emerges again on the opposite circumferential side of the tie rod 27. The locking wedge is supported on the bottom side on a guiding surface of the upper tool part which can be loaded by pressure. The upper boundary surface of the wedge and of the corresponding oblong hole are sloped in the tie rod against the displacement direction. By sliding the wedge 28 into the tie rod with a specific force applied by the locking cylinder 22, the locking of the tie rod 27 can take place with a predetermined prestressing force so that the die casting tool can be held together by this prestressing force of the tie rods.

Figure 7:
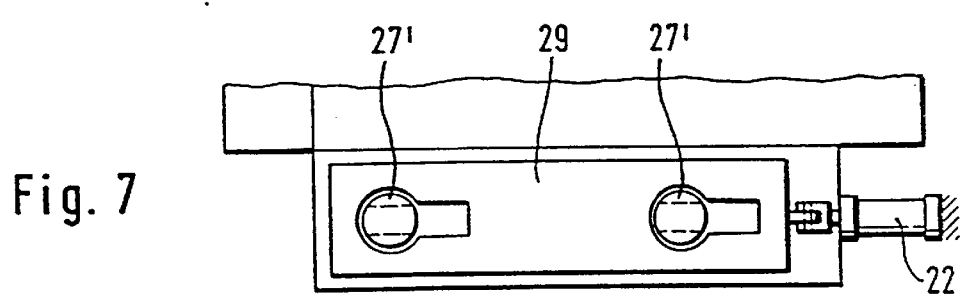
FIG. 7 is a partial top view of the die casting tool of FIG. 6.

Also in the embodiment of FIGS. 6 and 7, tie rods 27' are provided for the form-locking direct clamping together of the tool halves of the die casting tool 26'. For the releasable anchoring of the free tie rod ends in the movable tool part, two opposed notches are machined in in the area of the protruding ends of the tie rods. These notches leave an approximately rectangular carrying cross-section of the tie rod. The tie rod 27' which is secured against torsion, is installed in the die casting tool in a circumferential position such that the long side of the rectangular cross-section is situated parallel to the displacement direction of the strip 29. At least the upper boundary of the notches is arranged perpendicularly to the tie rod axis so that the rectangular cross-section between the notches changes into a rectangularly offset "head" which corresponds to the shaft cross-section of the tie rod. The lower boundary surface of this "head" is sloped in a wedge-shaped manner against the displacement direction of the locking strip 29.

The locking strip 29 can reach behind the "heads" of the tie rods. For each tie rod, the locking strip 29 has a keyhole-type opening whose round opening portion allows the "head" of the tie rod to pass through without hindrance, whereas the adjoining narrower rectangular opening portions reaches in a form-locking manner behind the "head". On both sides of the rectangular opening portion, the top side of the locking strip is also constructed in a wedge-shaped sloped manner against the displacement direction. Together with the corresponding slope of the bottom side of the head, the head can be reached behind with a high prestress when the locking strip is displaced at a high force by the locking cylinder 22 in the direction of the tie rods 27'. Of course, the locking strip is supported in a loadable manner on a guiding surface of the upper tool part so that the prestressing force and the explosive force occurring during the die casting can be transmitted by way of this guiding surface into the upper tool part.

Tie rods 27" are also provided for the direct form-locking clamping-together of the tool parts of the die casting tool 26" according to FIGS. 8 and 9. With these tie rods 27", the releasable anchoring of the free ends in the upper tool part is carried out by one locking ring 30, respectively, which can be swivelled back and forth by approximately 90° from the direction of the locking cylinder 22 by way of a radially projecting lever and a rod which is linked thereto.

On the interior side, the locking rings 30 are provided on certain circumferential sectors with a thread-type profiling. In circumferential sectors situated inbetween, the locking rings are configured with a smooth surface on the interior side and corresponding to the circumferential contour of the shaft portion of the tie rods 27". Analogously, the ends of the tie rods are also provided on certain circumferential sectors with a profiling of a matching external thread and, in circumferential sectors situated in-between, have a smooth surface corresponding to the core diameter of the external thread. The bottom side of the locking ring 30 is supported like a large nut on a guiding surface so that the prestress of the anchoring and the operating forces can be deflected into the movable tool part.

During the closing or opening of the die casting tool, the locking rings are swivelled relative to the tie rods installed in a torsion-proof manner in each case into such a circumferential position that the profiled areas of the ring and those of the tie rod are mutually positioned to fill gaps and the tie rods can therefore slide with their free ends without any hindrance through the locking rings. For closing the two tool halves, the locking rings 30 are rotated by approximately 90° into the locking position relative to the tie rods so that the ring-side and boltside thread-type profilings engage mutually and the locking rings rest under prestress against their guiding surface. Spreading forces acting upon the tool parts by way of the molten mass can then be absorbed directly between the tool parts in a power flux circuit remaining within the die casting tool. These forces will then not stress other components of the die casting machine situated outside the die casting tool.

Various kinematic modifications are contemplated in conjunction with the several illustrated embodiments. On one hand, all embodiments can have the tie rods arranged with their fixed end in the movable tool part and the locking devices arranged on the stationary tool part. Furthermore, in the case of the tie rod locking of FIGS. 8 and 9, the interior form of the locking rings can be integrated in an immobile manner in the pertaining tool part, the tie rods can be rotatably disposed in the pertaining tool part, and a corresponding rotary drive can be provided. The rotary drive of the locking rings or of the tie rods, as mentioned in conjunction with the embodiment of FIG. 2, can also take place centrally for all or for a larger number of locking devices by way of a wind-around drive by driving chains from the direction of a locking cylinder.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A die casting machine, comprising at least one die casting tool having relatively movable clamping plates and separable tool parts mounted between the relatively movable clamping plates, means for opening and closing the separable tool parts of the die casting tool, and a force-flow-circuit isolating apparatus which includes an associated drive directly associated with the separable tool parts and configured with mating surfaces separate from the clamping plates configured to selectively and lockingly clamp and press together the separable tool parts during a die casting operation against spreading forces acting thereupon from a pressure of a molten metal mass between the separable tool parts such that the spreading forces are caused to be isolated totally within separable tool parts and without transmission to the clamping plates and other structural members of the die casting tool external to the force-flow circuit isolating apparatus.

2. The die casting machine according to claim 1, wherein the isolating apparatus comprises tie rods integrated on or in the die casting tool such that, in a closed condition of the die casting too, the tie rods are anchorable on both sides of a mold parting surface thereof in the die casting tool and, in an opening condition of the die casting tool are detachable at least from one of the tool parts.

3. The die casting machine according to claim 2, wherein the tie rods are firmly anchored by a head in one of the tool parts which is stationary and, in the closed condition of the die casting tool, are anchored in a tension-proof but detachable manner on an opposite one of the tool parts which is movable.

4. The die casting machine according to claim 1, wherein the apparatus comprises exterior-side locking devices configured, in a closed condition of the die casting tool, to reach over a mold parting surface of the separable tool parts and, in an opening condition of the die cast tool, to be detachable at least from one of the separable tool parts.

5. The die casting machine according to claim 1, wherein a plurality of distributed casting cylinders for feeding casting material into a casting mold are arranged to fill the casting mold simultaneously from spaced points.

6. The die casting machine according to claim 5, wherein the casting cylinders, in a position thereof parallel to the parting plane of tool halves of the divisible die casting tool or of the die casting tools, are adjustably held at least in one adjusting direction and are fixable in the respective adjusting position.

7. The die casting machine according to claim 6, wherein the at least one die casting tool is a plurality of die casting tools arranged side-by-side, and a separate casting cylinder is operatively associated with each of the die casting tools for feeding casting material into an associated casting mold for simultaneously filling the casting molds.

8. The die casting machine according to claim 1, wherein the at least one die casting tool is a plurality of die casting tools arranged side-by-side, and a separate casting cylinder is operatively associated with each of the die casting tools for feeding casting material into an associated casting mold for simultaneously filling the casting molds.

9. The die casting machine according to claim 1, wherein for direct form-locking coupling of the separable tool parts, the force-flow-circuit-isolating apparatus comprises tie rods integrated on or in the die casting tool and extending on both sides of a mold parting surface of the die casting tool to isolate the locking pressures within the separable tool parts.

10. The die casting machine according to claim 1, wherein a sliding plate is arranged to be pushed over a retaining strip and dovetail claws associated with the tool parts, with a bottom side of the sliding plate reaching around the retaining strip and, on a top side thereof, having individual counter-claws adapted to the shape of the dovetail claws, with a mutual clearance therebetween being larger then a width of the dovetail claws.

* * * * *